Oct. 9, 1928.
1,686,688
C. J. FECHHEIMER
PRESSURE METER
Filed Dec. 31, 1921
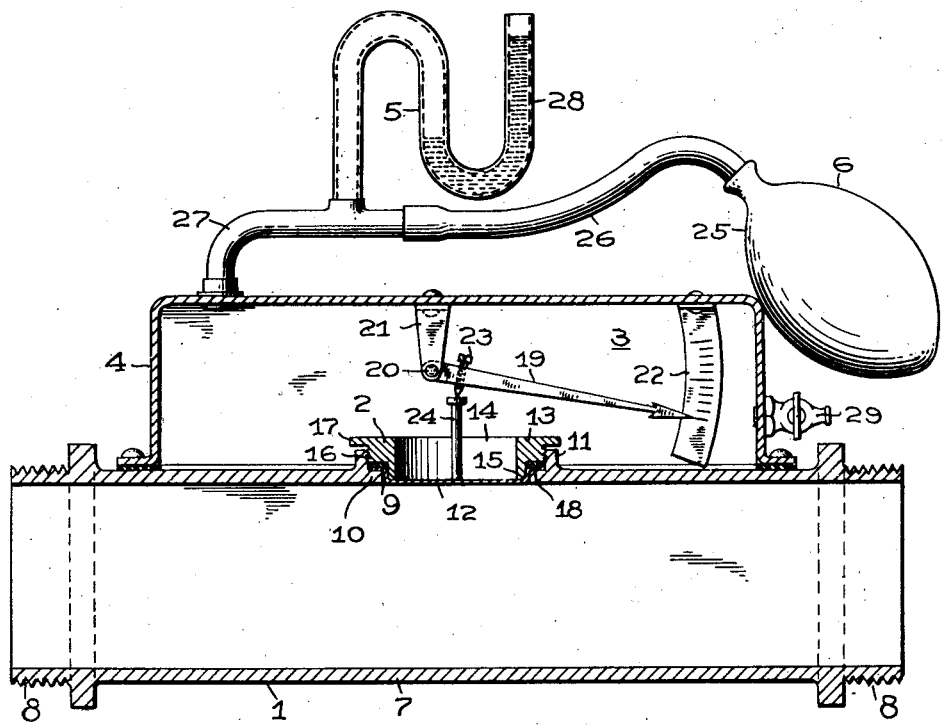
WITNESSES:
INVENTOR
Carl J. Fechheimer
BY
ATTORNEY Patented Oct. 9, 1928.

1,686,688

UNITED STATES PATENT OFFICE.

CARL J. FECHHEIMER, OF PITTSBURGH, PENNSYLVANIA, ASSIGNOR TO WESTERN ELECTRIC & MANUFACTURING COMPANY, A CORPORATION OF PENNSYLVANIA.

PRESSURE METER.

Application filed December 31, 1921. Serial No. 526,227.

My invention relates to fluid-pressure devices and particularly to devices for measuring static pressures of moving fluids.

One object of my invention is to provide a device of the above indicated character that shall accurately indicate the static pressure of a moving fluid and be substantially unaffected by the velocity or kinetic head thereof.

Another object of my invention is to provide a fluid-pressure device that shall facilitate, to a high degree the determination of the characteristics of fluid-impelling devices, such as fans and propellers.

A further object of my invention is to provide a fluid-pressure indicating device that shall be simple and durable in construction, economical to manufacture and simple in operation.

Heretofore, it has been found difficult to accurately measure the static pressure of a moving column of volatile fluid, such as air, for the reason that any device obstructing its path may be affected by the velocity or kinetic energy as well as by the static pressure.

In practicing my invention, I provide, in a fluid-conducting tube or conduit, a flexible diaphragm that is so placed, flush with one wall of the conduit, as to be substantially unaffected by the velocity forces, thereby eliminating them as factors and rendering the device accurately responsive to static pressures only.

The diaphragm is operatively connected to an indicating member. A second fluid-pressure device and a second indicating device are so disposed relative to the diaphragm as to effect a reading of the static pressure by a null method. That is, when the indicating member connected to the diaphragm gives an indication of static pressure, it may be moved to its zero position and the static pressure determined from the second indicating member.

The single figure of the accompanying drawing is a view, partially in elevation and partially in section, of a device embodying my invention.

A device constructed in accordance with my invention comprises, in general, a fluid-conducting tube 1, a pressure-responsive device 2, an indicating device 3, a casing 4 for the devices 2 and 3, an indicating device 5 and a fluid-pressure device 6.

The tube 1, which is adapted to receive air currents, such as from a fan or propeller to be tested (not shown) preferably comprises an intermediate portion 7 of rectangular cross-section, and end portions 8 that may be of threaded circular cross-section, or of other construction, for attachment to adjacent sections of a conduit, not shown.

The device 2 is disposed in an opening 9 in the portion 7, around which are disposed an annular flange 10, constituting a portion of one wall of the portion 7, and a transversely projecting annular flange 11. A diaphragm 12, of thin rubber or other suitable material, is held in position, flush with the inner surface of one wall of the portion 7, by a collar or nut device 13 having a relatively large central opening 14, an annular portion 15 for holding the diaphragm 12 in position, a threaded portion 16 for co-operation with the flange 11, and an outer flange 17 for adjusting the same.

The portion 16 constitutes a shoulder between which and the flange 10, the edges of the diaphragm 12 and a yieldable washer 18, such as felt, are disposed. The pointer 19 is pivoted, by a pin 20, to a standard 21 that is mounted on the casing 4 and co-operates with a scale 22 that is also mounted in the casing 4. An opening or window (not shown) may be provided in the casing opposite the pointer 19 and the scale 22. The pointer 19 is provided with an adjusting screw 23 adjacent to its pivoted end for co-operation with the upper end of a member or pin 24 having its lower end secured to the diaphragm 12.

The pressure device 6 may comprise a rubber bulb 25 and a flexible rubber tube 26, or other suitable device or pump, that is connected to a tube 27 communicating with the interior of the casing 4. The indicating device 5 may comprise a usual U-tube 28 having a quantity of water or other suitable liquid therein.

In operation, since there is no obstruction of any kind in the conduit, the diaphragm 12 will respond substantially only to the static pressure of the fluid, irrespective of the velocity thereof, and will actuate the pointer in accordance with the magnitude of that pressure. By manipulating the device 6, as by pumping the bulb 25, a static pressure may be built up, in the casing 4, in opposition to the static pressure in the conduit 1, thus moving the diaphragm 12 and the pointer 19 to their zero-pressure positions in opposition to the static pressure. The pressure exerted by the device 6, in thus moving the pointer 19 back to its zero position, will be transmitted to the liquid in the U-tube 28 from which an accurate indication of the static pressure in the tube 1 may be obtained. A pet cock 29, or other suitable device, may be provided to permit the escape of air from the casing 4.

While I have shown and described a particular form of my invention, changes and modifications may be made therein without departing from the spirit and scope of my invention, and such modifications are intended to be covered by the appended claims.

I claim as my invention:

1. In a fluid-pressure instrument, the combination with a fluid-conducting tube having a portion of substantially uniform interior cross-sectional area and an opening through a side-wall of said portion, of an imperforate flexible diaphragm structure closing said opening and having its inner surface flush with the adjacent inner surfaces of the tube and conforming to the uniform cross-sectional contour of the tube, and means for securing the diaphragm to the tube in fluid-tight relation thereto.

2. In a fluid-pressure instrument, the combination with a fluid-conducting tube having a portion of substantially uniform interior cross-sectional area and an opening through a side-wall of said portion, of an imperforate flexible diaphragm structure closing said opening and having its inner surface flush with the adjacent inner surfaces of the tube and conforming to the uniform cross-sectional contour of the tube, indicating means to be actuated by said diaphragm, and means for securing the diaphragm to the tube in fluid-tight relation thereto.

3. In a fluid-pressure instrument, the combination with a fluid-conducting tube having a portion of substantially uniform interior cross-sectional area and an opening through a side-wall of said portion, of an imperforate flexible diaphragm structure closing said opening and having its inner surface flush with the adjacent inner surfaces of the tube and conforming to the uniform cross-sectional contour of the tube, means for securing the diaphragm to the tube in fluid-tight relation thereto, a chamber structure surrounding the diaphragm in fluid-tight relation to the outer surfaces of the tube, means for introducing a fluid-pressure into said chamber, and indicating means to be actuated by the diaphragm.

4. In a fluid-pressure instrument, the combination with a fluid-conducting tube having a portion of substantially uniform interior cross-sectional area and an opening through a side-wall of said portion, of an imperforate flexible diaphragm structure closing said opening and having its inner surface flush with the adjacent inner surfaces of the tube and conforming to the uniform cross-sectional contour of the tube, means for securing the diaphragm to the tube in fluid-tight relation thereto, a chamber structure surrounding the diaphragm in fluid-tight relation to the outer surfaces of the tube, means for introducing a fluid-pressure into said chamber, indicating means to be actuated by the diaphragm and means for indicating the fluid-pressure introduced into said chamber.

5. In a fluid-pressure instrument, the combination with a fluid-conducting tube, of indicating means comprising a flexible diaphragm normally flush with an inner surface of the tube to respond substantially only to the static pressure of a moving fluid therein, means for securing the diaphragm in position, an indicating member operatively connected to the diaphragm, fluid-pressure means for moving the indicating member to its zero position in opposition to said static pressure and indicating means actuated in accordance with the force exerted by said fluid-pressure means.

6. A fluid-pressure instrument comprising a fluid-conducting tube having a portion of uniform rectangular cross-sectional area to provide flat walls one of which has an opening therethrough, an imperforate flexible diaphragm filling said opening and disposed normally flush with the adjacent flat surfaces in the apertured wall, an indicating member operatively connected to the diaphragm, a fluid-tight structure surrounding said diaphragm outside the tube and means for setting up a counter-fluid pressure in said chamber.

7. Fluid-operated mechanism comprising a conduit traversed by a fluid, the wall structure of said conduit comprising a flat section having an opening therein, a diaphragm disposed in said opening and normally occupying a position such that its inner surface is substantially included in the plane of the inner surface of said flat conduit section, and a member actuated by said diaphragm.

8. Fluid-operated mechanism comprising a conduit traversed by a fluid, the wall structure of said conduit comprising a flat section having an opening therein, a diaphragm disposed in said opening and normally occupying a position such that its inner surface is substantially included in the plane of the inner surface of said flat conduit section, means for applying a force to said diaphragm to hold it substantially in said position despite the influence of the static pressure of said fluid, and means for determining the magnitude of said force.

9. Fluid-operated mechanism comprising a conduit traversed by a fluid, the wall structure of said conduit comprising a flat section having an opening therein, a diaphragm disposed in said opening and normally occupying a position such that its inner surface is substantially included in the plane of the inner surface of said flat conduit section, indicating mechanism actuated by said diaphragm upon movement thereof, means for applying a force to said diaphragm to hold it substantially in said position despite the influence of the static pressure of said fluid, and means for determining the magnitude of said force.

10. Fluid-operated mechanism comprising a conduit traversed by a fluid, the wall structure of said conduit comprising a flat section having an opening therein, a diaphragm disposed in said opening and normally occupying a position such that its inner surface is substantially included in the plane of the inner surface of said flat conduit section, means including a chamber for applying pressure to said diaphragm to hold it substantially in said position despite the influence of the static pressure of said fluid, and means for determining the magnitude of the pressure existing in said chamber.

11. Fluid-operated mechanism comprising a conduit traversed by a fluid, the wall structure of said conduit comprising a section nondeformable under the influence of the static pressure of said fluid and a deformable section substantially in alinement with said first section, and a member actuated by said deformable section.

In testimony whereof, I have hereunto subscribed my name this 16th day of December, 1921.

CARL J. FECHHEIMER.